UNITED STATES PATENT OFFICE.

EMIL FISCHER, OF BERLIN, GERMANY, ASSIGNOR TO C. F. BOEHRINGER & SOEHNE, OF WALDHOF, GERMANY.

OXYPURIN AND PROCESS OF MAKING SAME.

SPECIFICATION forming part of Letters Patent No. 631,706, dated August 22, 1899.

Application filed January 31, 1898. Serial No. 668,644. (No specimens.)

*To all whom it may concern:*

Be it known that I, EMIL FISCHER, a citizen of the Empire of Germany, residing at Berlin, in the Empire of Germany, have invented certain new and useful Improvements in the Manufacture of Oxypurins and their Derivatives; and I do hereby declare the following to be a full, clear, and exact description of the invention, such as will enable others skilled in the art to which it appertains to make and use the same.

The present invention relates to the preparation of oxy-purins and their alkyl derivatives, and, primarily, the preparation of these bodies from trichloropurin, a compound which is described in application for Letters Patent of the United States, Serial No. 640,763, filed June 14, 1897.

Before proceeding with the description it should be stated that the nomenclature herein followed is that adopted by the article published in *Berichte der Deutschen Chemischen Gesellschaft*, Vol. 30, page 549. According to this nomenclature a large number of bodies—such as caffein, uric acid, guanin, adenin, &c.—are designated by the generic term "purins" and their nucleus, the "purin group," has its several carbon and nitrogen-atoms numbered in the following manner:

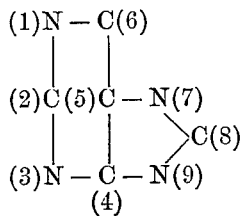

Bearing this nomenclature and system of numbering the position of the atoms in mind, the use of terms in the following description will be readily understood:

The two known methyl-trichloropurins described in *Berichte der Deutschen Chemischen Gesellschaft*, Vol. 17, page 331, and Vol. 28, page 2,488, have hitherto not been susceptible of conversion into xanthin derivatives by the action of alkali for the reason that the latter causes the chlorine atom in the position 8 to be split off. I have found, however, that the unmethylated trichloropurin—the trichloropurin proper—which, together with its method of preparation, forms the subject-matter of Letters Patent of the United States No. 598,502, dated February 8, 1898, behaves in a radically different manner. This compound is a strong acid and forms stable alkali-salts, the formation of the salts resulting in such a modification in the affinities of the three chlorine atoms that on heating with alkali the chlorine atom in the position 6 instead of the chlorin atom in the position 8 is first split off and replaced by oxygen.

*At ordinary temperature.*—For example, when acting upon trichloropurin with alcoholic alkali at ordinary room-temperature the former is converted into 6-ethoxy-2-8-dichloropurin having the formula:

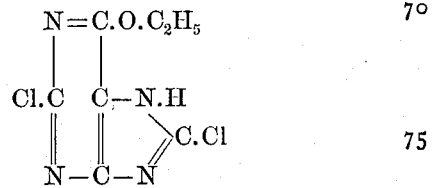

When the latter is heated with hydrochloric acid, it loses the ethyl-group, giving rise to 6-oxy-2-8-dichloropurin having the formula:

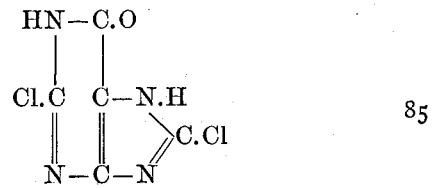

the latter being in turn, by reducing agents, converted into 6-oxypurin:

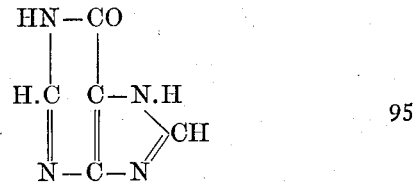

which has been shown to be identical with natural hypoxanthin. This splitting off of ethyl and the substitution of hydrogen for the chlorine atoms may also be accomplished directly in one operation by treating the 6-ethoxy-2-8-dichloropurin with hydriodic acid, in which case hypoxanthin is also obtained.

*At higher temperature.*—If the trichloropurin is acted upon with alcoholic alkali at higher temperature, a second chlorine atom is eliminated—namely, that occupying the position 2. As a result of this reaction we obtain 8-chloro-2-6-diethoxy-purin having the structural formula:

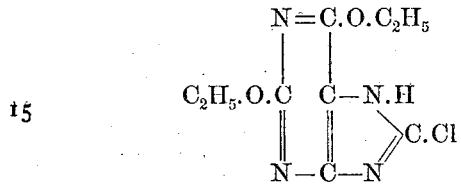

The latter body on treatment with hydrochloric acid loses the two ethyl groups, forming 2-6-dioxy-8-chloropurin having the structural formula:

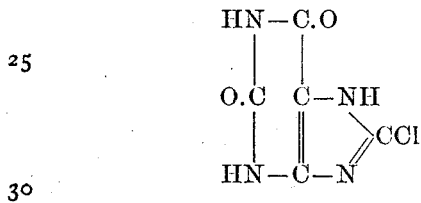

This latter body, which on account of its structure I term "chloro-xanthin," is by reduction converted into 2-6-dioxypurin:

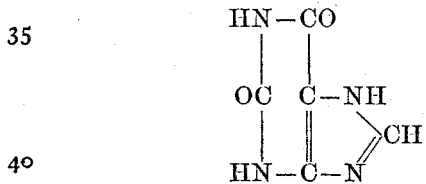

which is identical with natural xanthin. It is true of the 8-chloro-2-6-diethoxy-purin also that the elimination of the ethyl groups and the substitution of hydrogen for the chlorine atom may be simultaneously carried out by the action of hydriodic acid, xanthin being again obtained as above.

*Alkyl derivatives of xanthin and hypoxanthin.*—The same process may be followed advantageously in the preparation of the alkyl derivatives of xanthin and hypoxanthin. In this case the intermediate chloro compounds are first alkylized and then reduced. Thus the 6-oxy-2-8-dichloropurin is first converted into 1-7-dialkyl-6-oxy-2-8-dichloropurin, such as 1-7-dimethyl-6-oxy-2-8-dichloropurin having the formula:

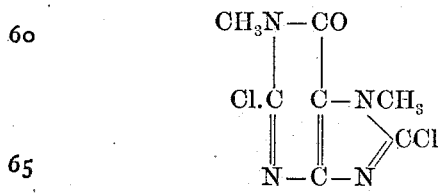

by treating an aqueous alkaline solution of the same with a haloid-ether, such as a halogen-methyl compound, the 1-7-dimethyl-6-oxy-2-8-dichloropurin being then by hydriodic acid reduced to 1-7-dimethyl-6-oxypurin or 1-7-dimethyl-hypoxanthin:

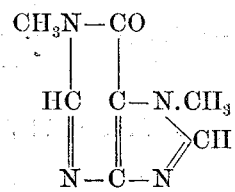

a body already obtained by Krüger by other methods. (See *Zeitschrift für Physiolog. Chemie*, Vol. 18, page 436.) In the same manner the 2-6-dioxy-8-chloropurin can by applying my invention and introducing the alkylizing step before reduction be converted into methylated products. Thus, for example, the said dioxy-chloropurin may be converted into chloro-caffein by methylating the same in alkaline solution. The chloro-caffein may, as is well known, be readily converted into caffein by reduction, for example.

*Aqueous alkali solution.*—By subsequent experiments and researches I have found that the 6-oxy-2-8-dichloropurin may be obtained directly from the trichloropurin by treating the latter with an aqueous solution of alkali instead of an alcoholic solution and heating the mixture.

It will be observed from the above that my invention, broadly considered, consists in treating trichloropurin with an alkali which may be added in the form of an alcoholic or an aqueous solution. The invention which is to be covered specifically herein also consists in the preparation of xanthins and hypoxanthins alkylized or free from alkyl by the action of reducing agencies with or without the intervention of methylating reagents. The invention further consists in such steps, details, and features as will be hereinafter specified, and pointed out in the claims.

In illustration of my invention I will now recite a number of examples giving what I consider the best methods of carrying out my invention, it being understood, however, that the proportions and conditions may be considerably varied without departing from the said invention. The proportions are all understood to be by weight.

*Example 1: Preparation of 2-8-Dichloro-6-Ethoxy-Purin.*

Four parts dry trichloropurin, whose properties and mode of preparation are set forth in my aforesaid application, Serial No. 640,763, dissolved in sixteen parts of alcohol, and this solution, after being rapidly cooled to about 10° to 15° centigrade, and which, as a rule, has a tendency to throw out crystals of the trichloropurin, is added to a solution of one and two-tenths parts of sodium in twenty-four parts of alcohol cooled to room-temperature. A clear pale yellow liquid results, which is spontaneously heated to about 30° centigrade and soon becomes turbid by reason of a precipitation of sodium-chlorid. The mixture is allowed to stand at ordinary temperature for three hours, whereupon fifty parts of water are added and the whole is supersatuated slightly with acetic acid. The alcohol is then evaporated off, whereby the dichloro-ethoxypurin is precipitated in colorless very flexible acicular crystals. The same is then purified by recrystallization from hot benzene. Its formula is $C_7H_6Cl_2N_4O$, or

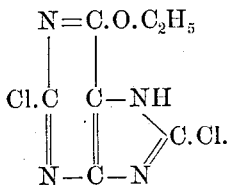

It trickles at about 190° centigrade and melts completely at about 200° centigrade, the fusion being accompanied by decomposition. It is soluble only with difficulty in hot water, but dissolves readily in hot alcohol and aceton.

The above converting process proceeds according to the equation:

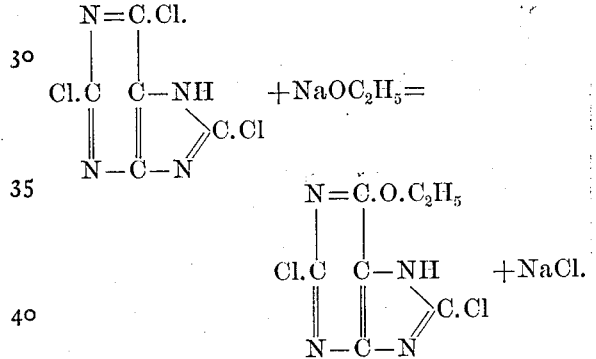

*Example 2: Preparation of 2-6-Dichloro-6-Methoxypurin.*

If in the place of the ethyl-alcoholic solution a methyl-alcoholic solution of sodium is employed, the other ingredients and conditions of the above process remaining the same, I obtain 2-8-dichloro-6-methoxypurin, which melts and decomposes at about 225° centigrade and which is considerably less soluble in benzene than the ethoxy compound.

The generic formula for both of the oxyalkyl-dichloro-purins is,

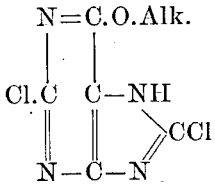

*Example 3: Preparation of 6-Oxy-2-8-Dichloropurin.*

*Process a.*—The 2-8-dichloro-6-ethoxy-purin described under example 1 may be converted into the new compound 6-oxy-2-8-dichloropurin by a mineral acid, preferably a haloid acid. I find the following to be the best manner to carry out this process:

Mix powdered 2-8-dichloro-6-ethoxypurin with five times its weight of fuming hydrochloric acid and heat the mixture on the water-bath. Solution rapidly takes place and the difficultly soluble 6-oxy-2-8-dichloropurin is soon thrown out in the form of course crystals. The conversion will be completed in about a half-hour, after which the whole is diluted with about ten parts of water and allowed to cool, after which the mother-liquor is separated from the crystals by filtration.

For the purpose of complete purification the new body is converted into the potassium-salt, which is completely decolorized by recrystallization from hot water to which some animal charcoal is added. The oxydichloropurin when recovered from the potassium-salt forms beautiful colorless acicular crystals having the formula $C_5N_4H_2Cl_2O$, or

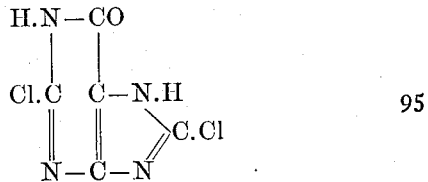

When heated to over 350°, it decomposes and turns brown. It dissolves with considerable difficulty even in hot water. It is more soluble in hot alcohol. Its aqueous solution has an acid reaction and decomposes carbonates. Its barium-salt crystallizes from a hot solution of the same in excess of baryta water in fine needles usually aggregated into fasces or bunches. Upon adding nitrate of silver to an ammoniacal solution of the purin forms a colorless amorphous precipitate.

The above process is explained in the following equation:

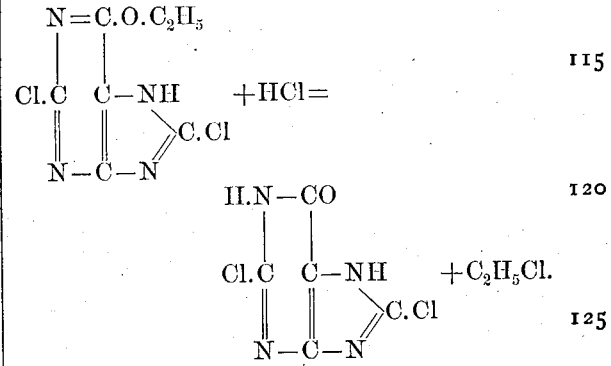

*Process b.*—The 6-oxy-2-8-dichloropurin may be obtained directly from the trichloropurin by substituting aqueous for alcoholic alkali in example 1 and heating the mixture. The chlorine atom is in this manner readily replaced by the hydroxyl group. The following detailed description discloses what I consider the preferred method of carrying out this modification:

An amount of trichloropurin is dissolved in sufficient potash lye to make the amount of alkali correspond to three molecules. The liquid is then heated to 100° centigrade and maintained at this temperature for three hours. The same thus acquires a pale pink color. The solution is then supersaturated with hydrochloric acid, whereby the 6-oxy-2-8-dichloropurin is thrown out in the form of fine reddish acicular crystals. The further purification is carried out in the manner set forth under Process a.

*Example 4: Preparation of Hypoxanthins.*

(a.) *Preparation of hypoxanthin from 6-oxy-2-8-dichloropurin.*—One part of the finely-powdered oxydichloropurin is added to ten parts hydrogen-iodide or hydriodic acid of the specific gravity 1.96, and after about one-half part of phosphoniumiodid or yellow phosphorous have been added the whole is first shaken for about an hour at ordinary temperature and then heated on the water-bath until an almost colorless solution is formed. On cooling the hydro-iodate of hypoxanthin is thrown out in the form of beautiful crystals. The entire quantity of this product is obtained by evaporating the hydrogen-iodid. The reaction takes place according to the equation:

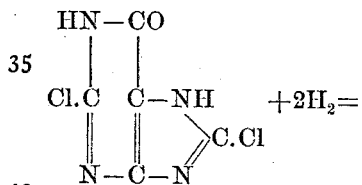

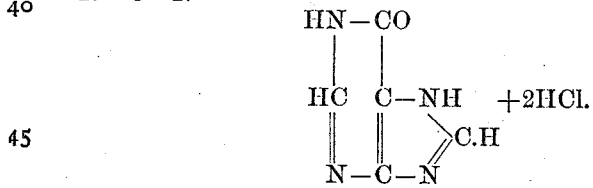

After forming a concentrated aqueous solution of the hydro-iodate the hypoxanthin may be obtained therefrom by neutralizing with ammonia. The product thus obtained is purified by recrystallizing from hot water, animal charcoal being added. The artificial compound thus prepared unites all the properties of natural hypoxanthin or 6-oxypurin.

(b.) *Preparation of hypoxanthin from 2-8-dichloro-6-ethoxypurin.*—If in place of the simple oxy-dichloropurin we employ the ethylized product—the 2-8-dichloro-6-ethoxypurin in the process under a—all other conditions remaining the same, the said ethylized oxydichloropurin will lose not only its two chlorine atoms, but also the ethyl-radical—that is to say, hypoxanthin or 6-oxy-purin will again result.

(c.) *Conversion of 2-8-dichloro-6-oxy-purin into dimethyl-hypoxanthin.*—One part of the dichloro-oxypurin is dissolved in an amount of normal potash lye computed for two molecules and one and one-half parts of methyliodid are added, whereupon the mass is heated to 80° centigrade in a closed vessel and maintained at this temperature and constantly agitated for two hours. The methyliodid completely disappears and the new body—1-7-dimethyl-6-oxy-2-8-dichloropurin—whose formula is $C_7H_6Cl_2N_4O$, or

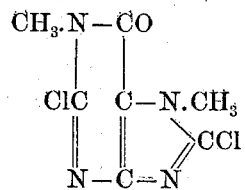

is formed and thrown out as a pale colored crystalline mass, being insoluble in alkalies. When recrystallized from hot alcohol and thereupon from hot water, it forms colorless acicular crystals or needles. Its melting-point being not sharply defined between 245° and 255° centigrade, the reaction takes place according the equation:

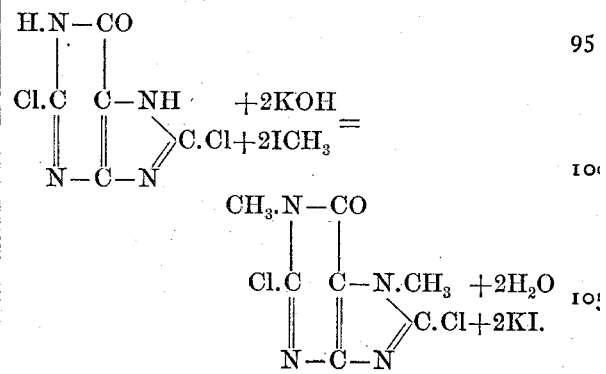

This alkylized oxy-dichloropurin upon being added to ten times its weight of hydrogen-iodid or hydriodic acid of the specific gravity gravity of 1.96 and excess of phosphoniumiodid and shaken at ordinary temperature is soon brought into solution and converted into dimethyl-hypoxanthin. On evaporating the liquid said alkylized hypoxanthin remains as crystalline hydro-iodate. The following equation expresses this reaction:

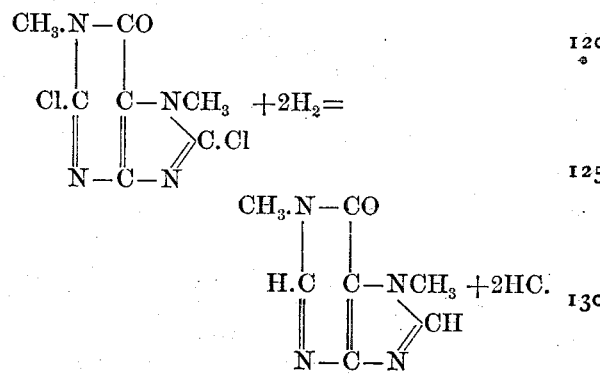

For the purpose of purification it is best converted into the compound described by Krüger in *Zeitschrift für Physiolog. Chemie,* Vol. 18, page 437, by means of sodium-iodid—that is to say, an aqueous solution of the hydroiodate is neutralized with soda-lye and evaporated to crystallization. The crystals are then recrystallized from hot eighty-per-cent. alcohol. The sodium-iodine compound, as well as the base liberated therefrom, are found to be identical with the bodies obtained from hypoxanthin by Krüger.

*Example 5: Preparation of 2-6-Diethoxy-8-Chloropurin from Trichloropurin.*

I heat trichloropurin, (one part,) together with a concentrated alcoholic solution of sodium-ethylate, (which contains one part of sodium,) in a closed vessel to 100° centigrade, maintaining this temperature for three hours. The sodium-ethylate must be in excess. The alcohol is then evaporated and the residue is dissolved in water, the resulting yellow solution being then supersaturated with acetic acid, whereby the diethoxy-chloropurin is obtained as a copious precipitate which forms fine needles. This new body has the formula, $C_9H_{11}N_4ClO_2$, or, structurally expressed:

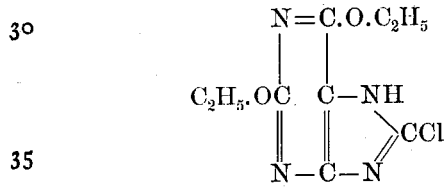

The reaction takes place according to the equation:

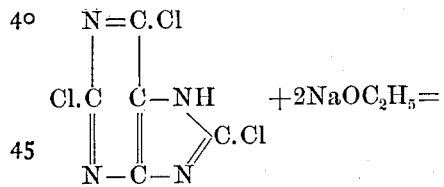

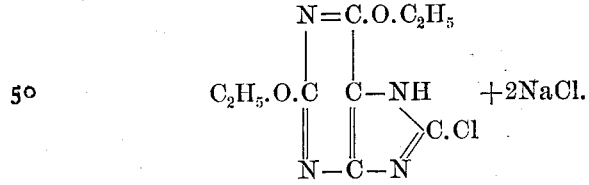

It is very similar in behavior to the mono-ethoxy compound described under example 1. Like the latter, it trickles at about 190° centigrade and melts at about 205°, the melting-point being not sharply defined and fusion being attended by decomposition and evolution of gas. In hot alcohol it is very readily soluble, but very difficult of solution in benzol. It is readily soluble in alkalies, including ammonia and baryta-water. Boiling water dissolves the same only with difficulty, one thousand parts of the same being required for the solution of one part of the compound.

*Example 6: Preparation of 2-6-Diethoxy-8-Chloropurin from 2-8-Dichloro-6-Ethoxy-Purin.*

The diethoxy compound may also be obtained from the mono-ethoxy-chloro compound by heating the same with excess of sodium-ethylate under substantially the same conditions set forth under example 5.

*Example 7: Conversion of 8-Chloro-2-6-Diethoxy-Purin into Xanthin.*

The chloro-diethoxy-purin may be converted into xanthin under the influence of reducing agents. Thus if the same is dissolved in ten times its weight of hydrogen-iodid or hydriodic acid of the specific gravity 1.96 at ordinary temperature the reduction begins promptly, iodine being liberated. The latter is again reduced by the addition of sufficient phosphonium-iodid or yellow phosphorus. The reduction is completed at the end of about an hour at ordinary temperature. In the course of this reaction the intermediate product 2-6-diethoxypurin is most probably formed, but remains dissolved in the hydrogen-iodid. This diethoxypurin, however, already undergoes a further conversion into 2-6-dioxypurin or xanthin in the course of the same reaction, the ethyl radicals being split off by the strong acid, particularly when dealing with large quantities. This second phase of the reaction is, however, only partial at ordinary temperatures, and consequently only a proportionately small quantity of hydriodate of xanthin is thrown out. If, on the other hand, the whole is subsequently heated on the water-bath, the conversion into xanthin becomes complete and its hydriodate is precipitated in the form of a thick crystalline mass. From this mass the hydriodic acid is evaporated and the residue is treated with dilute aqueous ammonia in slight excess and filtered. The residue is then dissolved in a large quantity of warm aqueous ammonia solution for purification. On boiling or evaporating the ammonia the xanthin is thrown out in the form of a colorless crystalline powder. The product thus obtained synthetically has all of the properties observed for natural xanthin. The reaction whereby the xanthin is formed under this head takes place according to the equations:

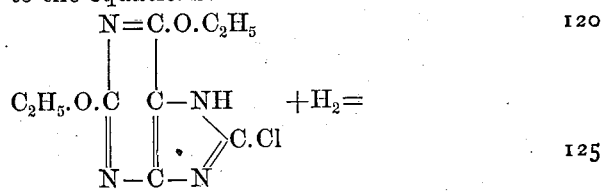

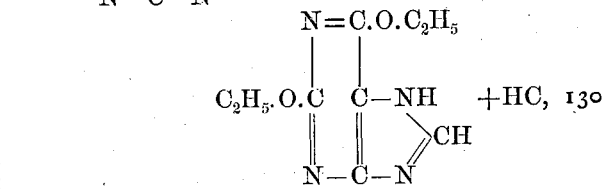

and

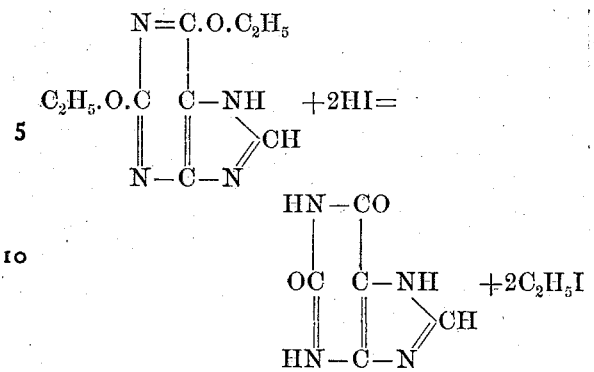

*Example 8: Conversion of 8-Chloro-2-6-Diethoxy-Purin into Chloro-Xanthin.*

If instead of acting upon the chlorodiethoxypurin with a reducing agent it is submitted to the influence of hydrochloric acid, the chlorine atom remains in the molecule, while the ethyl groups are split off, as under the ninth head. If one part of the powdered chlorodiethoxypurin is heated on the water-bath with five times its weight of hydrochloric acid of the specific gravity 1.19, it first goes into complete solution, and a short time thereafter the 8-chloro-2-6-dioxy-purin or chloroxanthin, which is soluble only with great difficulty, begins to be precipitated. The decomposition is completed at the end of about half an hour. The reaction takes place according to the equation:

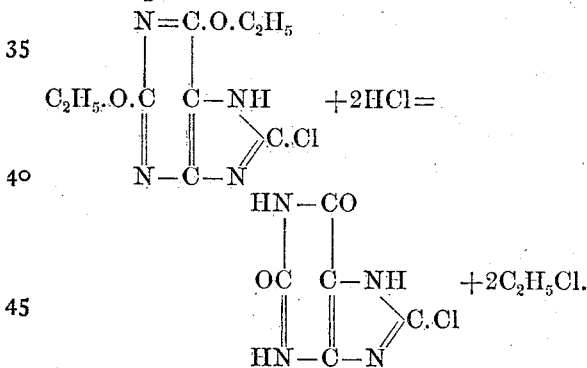

To completely purify, the chloro-xanthin is converted into the readily-crystallizing ammonium salt by dissolving in warm very dilute aqueous ammonia. On slowly cooling the ammonium salt is obtained in the form of small, but well developed, apparently rectangular tablets. The said ammonium salt is then again decomposed by acid, such as hydrochloric acid, as will be readily understood. 8-chloroxanthin has the composition $C_5H_3ClN_4O_2$ and the molecular structure:

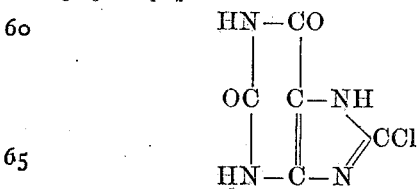

It dissolves with difficulty in hot water and alcohol and glacial acetic acid. From the warm solution of its salts it is precipitated by mineral acids as a colorless granular crystalline mass. On heating it chars without melting. It dissolves readily in concentrated sulfuric acid, being precipitated from such solution by the addition of water. Its alkali salts are readily soluble in water. Its potassium salt crystallizes from strong potash-lye in the form of very fine pliable needles. Its ammonium salt is much less soluble. On slowly cooling of an aqueous solution of the same it crystallizes in small, but well-developed, apparently rectangular tablets. Chloroxanthin is readily converted into xanthin by reduction with hydrogen-iodid. Like xanthin, it gives a very strong murexide test.

*Example 9: Conversion of Chlorozanthin into Chlorocaffein.*

This conversion is effected by the aid of an alkylizing agent. For this purpose two parts of chloroxanthin are dissolved in so much normal potash-lye that the amount of caustic potash corresponds to three molecules. The solution is then shaken for two hours, together with five parts of methyl-iodid, in a closed vessel, at a temperature of 80° centigrade. During this operation the largest portion of the chloro-caffein, which is 1-3-7-trimethyl-2-6-dioxy-8-chloropurin, is separated in the form of fine needles. These are put upon the filter after cooling and washed with very dilute soda-lye, which acts to remove the traces of an acid compound mixed with the crystals. The latter are then recrystallized from hot water or hot alcohol. The product is identical with chloro-caffein, which has been formed by chlorinizing natural caffein and which may be converted into the latter by known methods, such as reduction.

My present application, while it describes the new compounds 2-8-dichloro-6-ethoxypurin, 2-8-dichloro-6-methoxypurin, 6-oxy-2-8-dichloropurin, 8-chloro-2-6-diethoxypurin, 8-chloro-xanthin, and the processes of preparing them and also the new processes of preparing xanthin, hypoxanthin, and chloro-caffein, does not herein claim these compounds or the specific processes, since these are all covered in a series of applications filed by me concurrently herewith; but these processes and compounds are herein set forth for the purpose of as full as possible a disclosure of the matter which is generically covered by the claims. This invention, generically, is the preparation of xanthins, whether they be xanthin proper, hypoxanthins proper, or alkylized by reduction of chloro-oxy-purins, under which designation I embrace all of the following compounds: 2-8-dichloro-6-ethoxypurin, 2-8-dichloro-6-oxypurin, 8-chloro-2-6-diethoxypurin, or 8-chloro-2-6-dioxypurin, (chloroxanthin,) or methylized products, such as 1-7-dimethyl-6-oxy-2-8-dichloropurin or 1-3-7-trimethyl-2-6-oxy-8-chloropurin, (chloro-caffein.) It also involves the treatment of a chloropurin with an alkali and the subsequent reduction of the resulting chloro-oxypurins either with or without prior alkylization.

What I claim, and desire to secure by Letters Patent of the United States, is—

1. The process in the art of preparing xanthins which consists in acting upon a chloro-oxypurin with a reducing agent.

2. The process in the art of preparing xanthins which consists in acting upon a chloro-oxypurin with hydriodic acid and phosphonium-iodid.

3. The process in the art of preparing hypoxanthins, which consists in adding to a di-chloro-oxypurin hydriodic acid and an excess of phosphonium-iodid and shaking the whole at ordinary temperature.

4. The process which consists in acting upon an alkylized oxy-dichloropurin with a reducing agent, whereby an alkylized hypoxanthin is obtained.

5. The process which consists in acting upon an alkylized oxy-dichloropurin with hydrogen-iodid and excess of phosphonium-iodid.

6. The process which consists in acting upon an alkylized oxy-dichloropurin with hydrogen-iodid and excess of phosphonium-iodid, and shaking the mixture at ordinary temperature.

7. The process in the art of preparing xanthins which consists in treating trichloropurin with an alkali and then submitting the resulting chloro-oxypurin to a reducing agent.

8. The process which consists in treating 6-oxy-2-8-dichloropurin with an alkylizing agent to alkylize the free imido groups, and then reducing the resulting alkylized oxy-dichloropurin, whereby alkylized hypoxanthin is obtained.

9. The process which consists in treating an alkaline solution of 6-oxy-2-8-dichloropurin with alkyl-iodid for the purpose of obtaining alkylized 6-oxy-2-8-dichloropurin.

10. The process which consists in dissolving dichloro-oxy-purin in potash-lye and heating the solution together with methyl-iodid, all in the proportions and under the conditions substantially as specified.

11. The process which consists in the following steps: converting trichloropurin into 2-8-chloro-6-alkyl-oxypurin by treatment with an alcoholic alkali; then acting upon the dichloroalkyl-oxypurin with hydrochloric acid; and alkylizing the resulting dichloro-oxy-purin.

12. As a new chemical compound, 1-7-di-methyl-6-oxy-2-8-dichloropurin having the formula hereinabove given and which is insoluble in alkalies, but soluble in hot water and hot alcohol, which crystallizes in colorless needles and whose melting-point is not sharply defined between 245° (centigrade) and 255° (centigrade).

13. The process of preparing alkylized hypoxanthins which consists in treating alkylized-oxy-dichloropurins with a reducing agent.

14. The process of preparing di-alkyl-hypoxanthin which consists in treating 1-7-dialkyl-6-oxy-2-8-dichloropurin with a reducing agent.

15. The process which consists in adding hydriodic acid to 1-7-dimethyl-6-oxy-2-8-dichloropurin and phosphonium-iodid in the proportions, substantially as given and shaking the whole at ordinary temperature.

16. The process which consists in adding hydriodic acid to 1-7-dimethyl-6-oxy-2-8-dichloropurin and phosphonium-iodid in the proportions, substantially as given and shaking the whole at ordinary temperature, then evaporating the resulting liquid, dissolving the resulting crystals of hydro-iodate of dimethyl-hypoxanthin in water, neutralizing such solution with soda-lye and evaporating and finally recrystallizing the residue from hot alcohol.

17. The process which consists in converting trichloropurin into 2-8-dichloro-6-alkyl-oxypurin by treatment with an alcoholic alkali; then acting upon the dichloro-alkyl-oxypurin with hydrochloric acid; alkylizing the resulting dichloro-oxypurin; and finally reducing the alkylized dichloro-oxy-purin.

18. The process which consists in treating an alkyl-oxy-chloropurin with a de-alkylizing agent, then alkylizing the resultant compound and submitting the compound thus obtained to the action of a reducing agent.

19. The process which consists in treating an alkyl-oxy-chloropurin with hydrochloric acid, then methylating the resultant body and then submitting the methylated product to the action of a reducing agent.

20. The process which consists in acting upon trichloro-purin with an alcoholic alkali, then allowing the whole to stand, then adding water and a slight excess of acid, then evaporating, then adding hydrochloric acid to the resultant dichloro-ethoxy-purin and heating and separating the resultant oxy-dichloro-purin, then methylizing the latter compound with potash-lye and methyl-iodid, heating and agitating, whereby alkylized oxy-dichloro-purin is obtained.

21. The process which consists in acting upon trichloro-purin with an alcoholic alkali, then allowing the whole to stand, then adding water and a slight excess of acid, then evaporating, then adding hydrochloric acid to the resultant dichloro-ethoxy-purin and heating and separating the resultant oxy-dichloro-purin, then methylizing the latter compound with potash-lye and methyl-iodid, heating and agitating, whereby alkylized oxy-dichloro-purin is obtained, then adding the latter compound to hydrogen-iodid and phosphonium-iodid and agitating the mixture at ordinary temperature.

In testimony whereof I affix my signature in presence of two witnesses.

EMIL FISCHER.

Witnesses:
CHAS. H. DAY,
HENRY HASPER.